United States Patent Office 2,859,113
Patented Nov. 4, 1958

2,859,113

CARBOHYDRATE FOOD COMPRISING 0.08 TO 10 PERCENT UREA

David J. Goodfriend, Philadelphia, Pa.

No Drawing. Application June 23, 1953
Serial No. 363,681

9 Claims. (Cl. 99—1)

This invention relates to an improved food composition. More specifically, this invention relates to refined carbohydrate foods such as refined sugars, refined starches, refined cereals, and the like, and to confections, candies, cakes, cookies, beverages, soft drinks, carbonated waters and other ingestible substances and food products containing refined carbohydrates, having small amounts of urea or carbamide added thereto in such a manner that the urea is present in them at the time they are taken into the mouth.

This application is a continuation-in-part of application Serial No. 121,070, filed October 12, 1949, now abandoned.

It is now generaly recognized that tooth decay in human beings is initiated by the formation of acids in the mouth resulting from the acidic decomposition of refined carbohydrate foods. I have discovered that when urea is added to refined carbohydrate foods and food products and beverages containing refined carbohydrates, the urea will control and prevent the formation of decay-initiating acids in these foods because the urea is hydrolyzed by the catalytic action of the enzyme urease in the mouth to form ammonia, carbon dioxide, ammonium carbamate and ammonium carbonate which neutralize acidity and inhibit the action of acid-forming microorganisms. Thus, the addition of urea, which is stable, to foods and food products which are taken into the mouth, exposes the urea to the catalytic action of urease which decomposes the urea to ammonium ions which control and prevent the formation of acidity and thereby prevent and reduce the incidence of tooth decay, and aid the digestion of refined carbohydrate foods.

Urea is a normal ingredient of saliva. Its concentration in saliva varies. If the urea content of the saliva is adequate, and the content and consistency of the food allows penetration of the saliva with adequate urea, this urea normally fortifies oral carbohydrate debris against the formation of tooth-corroding acid. The urea content of saliva may be made inadequate by the refining process which removes urea and urea-forming nitrogens from natural foods. Refined carbohydrate food and food products may also be of a consistency which cling to tooth surfaces and crevices and resist penetration by the saliva which contains urea, and thus prevent the urea normally in the saliva from controlling acid formation in that refined carbohydrate. Also, the concentration of refined carbohydrate may be so great that a normal amount of urea in the saliva is inadequate. Finally, the refined carbohydrates may penetrate and saturate plaque material on the teeth where the penetration by saliva is inadequate to prevent or control the formation of tooth-corroding acid. I have discovered that all of these factors which contribute to the cause of tooth decay are prevented and controlled by the addition of urea or carbamide to refined carbohydrate foods, confections, beverages and other food products and ingestible substances containing refined carbohydrates in such a manner and at such a time that they are mixed or impregnated or coated with urea or carbamide at the time they are introduced into the mouth. Thus, this invention prevents and reduces the incidence of tooth decay.

I have found that an effective method to add the urea or carbamide to refined carbohydrate foods, food products and beverages containing refined carbohydrates is to add the urea in powder or solution to these substances at a stage of their processing when subsequent processing will not degrade the urea. Urea is degraded by certain temperatures and by the enzyme urease. Thus the urea must be added to the foods and food products in a manner and at a time when they will not again or later be subjected to heat above 120° F. or to the action of yeast or other substances which form urease or may otherwise degrade the urea, or carbamide.

Natural foods contain enzyme and cellulose and other substances which aid in their own digestion and in the digestion of other foods. These substances are removed by the refining process, in the same manner that the refining of rice removes important and essential vitamins, and it is important to the health and integrity of the teeth and mucous membranes to replace urea in refined foods. Cereals, candies, chocolates, cakes, cookies, and other foods and food products made of or with refined carbohydrates may be so compact and concentrated as to be comparatively insoluble in and resist the penetration of and digestion by saliva and other digestive juices. Urea or carbamide added to these foods and food products makes them more soluble, less sticky, and more digestible while at the same time it prevents and controls their acidic degradation. Urea accomplishes these beneficial purposes when mixed through these foods, etc. Urea increases the solubility of other substances with which it is mixed, and it is highly soluble itself. Also, urea dissolves the protein mucous of the saliva and thereby makes it a better solvent and penetrating solution. Thus, the addition of urea or carbamide as provided by this invention to table sugar, candies, chocolates, pastries, confections, cereals, cakes and drinks containing refined carbohydrates helps prevent tooth decay and aids the normal, healthy digestion of these foods and food products.

Many soft drinks, carbonated drinks and beverages containing refined carbohydrates have a strong acid reaction because of their other ingredients such as citric acid. These drinks have been shown to be capable of dissolving or corroding the inorganic structures of the teeth, and may initiate tooth decay. The addition of urear or carbamide to these drinks will not alter their taste or other characteristcis, but when the drink is introduced into the mouth, the urea is hydrolyzed by the urease in the mouth to form ammonium carbonate, etc., which neutralizes and attenuates the acidity and thus prevents deleterious effects which the drink may otherwise cause.

The amount of urea to be added to refined carbohydrate foods, food products, and other ingestible substances and drinks containing refined carbohydrates is determined by the amount of urea required to control their acidity in the mouth. This may differ with the different foods and drinks. The critical range of urea concentration for maximum effectiveness in this invention is from 0.08 to 10 percent by weight of the product to which it is added. This is the range of maximum reaction of urea with the enzyme urease. The urea concentration required is directly proportional to the speed of dissolution and digestion of the food substance in saliva, and other digestive juices. Thus, refined table sugars and drinks with acidic or refined carbohydrate contents may require minimum amounts of urea within the 0.08 to 10 percent critical range. Processed refined carbohydrate foods and food products such as cakes, candies, etc., with varying resistance to dissolution would require varying concentrations of urea within the critical range for maximum reaction with urease. Cereals and other food products containing refined carbohydrates which may be eaten with milk, cream or water would require varying amounts of urea within the critical range.

The effect of ingested urea is completely non-toxic and is similar to the ingestion of table salt with foods. The effectiveness of the addition of small amounts of urea to foods to control acid formation in that food is aided by the fact that the urease catalyzes hydrolysis and synthesis of urea in a closed chain reaction in which the urease is the catalytic agent as shown by the following formula:

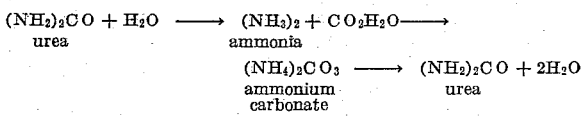

The ingestion of urea in critical percentages as provided by this invention reinforces the urease-urea reaction in the stomach and on and in the gastric mucosa. The urease-urea reaction in and on the gastric mucosa is a homeostatic factor which protects it against the corrosive action of gastric acidity, and the urease-urea reaction in the stomach reduces the intensity of the gastric acidity. Thus, this invention aids in the protection, and integrity of the gastric mucous membrane and thereby aids normal digestion and helps to prevent digestive and gastrointestinal disturbances.

The method by which urea or carbamide is added to the refined carbohydrate foods and food products and drinks containing refined carbohydrates includes mixing powdered urea or urea in solution directly with the refined carbohydrate or with the food product and drink, or impregnating the urea powder or solution into the food product by means of pressure spraying or otherwise, or by using a coating or icing of urea on the finished food or food product, at a time when further processing will not alter the urea in the finished product. The urea may be combined with an accepted preservative or vitamin or other substance which would enhance its impregnation in the food or food product. It is essential to the purpose of this invention that the addition of urea or carbamide be made so that the urea is unchanged at the time the food is introduced into the mouth and is present as such within the ranges previously stated when ingested.

I am aware of the use of urea as a diuretic and also as an additive to certain foods during processing of same, as well as in dentifrices and mouth washes as disclosed in my Patent 2,549,749. However, such prior practices fail to teach the essential features of my invention which is based essentially on having urea present as such in refined carbohydrate foods at the time of ingestion of same so as to have the urea present in the oral cavity in active critical amounts to prevent the formation of tooth decay-initiating acids in the mouth.

It is to be understood that my invention is susceptible of numerous embodiments and variations within the scope of the present disclosure which are intended to be covered by the appended claims.

I claim:

1. Refined carbohydrate food comprising 0.08 to 10 percent by weight of urea.

2. Refined table sugar comprising 0.08 to 10 percent by weight of urea.

3. Confectionery comprising 0.08 to 10 percent by weight of urea.

4. Cereals comprising 0.08 to 10 percent by weight of urea.

5. Soft drinks comprising refined sugars, acids, and 0.08 to 10 percent by weight of urea.

6. Food products comprising refined sugars and 0.08 to 10 percent by weight of urea.

7. A carbonated beverage containing 0.08 to 10 percent by weight of urea.

8. A carbonated beverage containing sugar and 0.08 to 10 percent by weight of urea.

9. A soft drink containing sugar and 0.08 to 10 percent by weight of urea.

References Cited in the file of this patent

UNITED STATES PATENTS

| 2,067,908 | Epstein | Jan. 19, 1937 |
| 2,067,911 | Frey | Jan. 19, 1937 |
| 2,326,278 | Baker | Aug. 10, 1943 |
| 2,526,614 | Butterfield | Oct. 17, 1950 |
| 2,542,886 | Wach | Feb. 20, 1951 |
| 2,549,759 | Goodfriend | Apr. 24, 1951 |

FOREIGN PATENTS

| 124,804 | Australia | July 17, 1947 |

OTHER REFERENCES

U. S. Dispensatory, 24th ed., 1947, Lippincott, Philadelphia, Pa., pp. 1257–1259, BS 151.2 D5 1947.

Lesser: Drug and Cos. Ind., November 1947, pp. 611–613 and 696–699 (pp. 698 and 699 pert.).

Manufacturing Chemist, June 1942, p. 140.

Science News Letter, November 1948, p. 301.

Stephan: Proc. Soc. Exp. Biol. and Med., February 1944, pp. 101–104.

Stephan: Jour. Dental Res., vol. 22 (1943), pp. 63–71.

Jour. Am. Dent. Assn., May 1950, pp. 625 and 626.